US012071358B2

(12) United States Patent
Hassanzadeh et al.

(10) Patent No.: US 12,071,358 B2
(45) Date of Patent: Aug. 27, 2024

(54) METHOD FOR DETERMINING A DOSE OF COAGULANT FOR TREATING RAW WATER

(71) Applicant: SUEZ INTERNATIONAL, Paris la Defense (FR)

(72) Inventors: Sepideh Hassanzadeh, Houilles (FR); Christophe Caudron, Triel sur Seine (FR); Isabelle Baudin, Nanterre (FR); Delphine Steinmann, Lamorlaye (FR); Gilles Fay, Paris (FR)

(73) Assignee: SUEZ INTERNATIONAL, Paris (FR)

( * ) Notice: Subject to any disclaimer, the term of this patent is extended or adjusted under 35 U.S.C. 154(b) by 376 days.

(21) Appl. No.: 17/259,189

(22) PCT Filed: Jul. 12, 2019

(86) PCT No.: PCT/EP2019/068899
§ 371 (c)(1),
(2) Date: Jan. 10, 2021

(87) PCT Pub. No.: WO2020/012022
PCT Pub. Date: Jan. 16, 2020

(65) Prior Publication Data
US 2021/0155510 A1   May 27, 2021

(30) Foreign Application Priority Data

Jul. 13, 2018  (FR) ...................................... 1856456
Sep. 28, 2018 (FR) ...................................... 1859025

(51) Int. Cl.
*C02F 1/52* (2023.01)

(52) U.S. Cl.
CPC ...... *C02F 1/5209* (2013.01); *C02F 2209/001* (2013.01); *C02F 2209/05* (2013.01);
(Continued)

(58) Field of Classification Search
CPC .... C02F 1/5209; C02F 1/52; C02F 2209/001; C02F 2209/05; C02F 2209/06;
(Continued)

(56) References Cited

U.S. PATENT DOCUMENTS 6,408,227 B1* 6/2002 Singhvi ............... G05B 13/027
700/32

FOREIGN PATENT DOCUMENTS

JP      2013-94686 A     5/2013
WO   2009/002192 A1   12/2008
(Continued)

OTHER PUBLICATIONS

Ratnaweera, et al., "State of the Art of Online Monitoring and Control of the Coagulation Process", Water 2015, vol. 7(11), pp. 6574-6597, 2015.
(Continued)

*Primary Examiner* — Akash K Varma
(74) *Attorney, Agent, or Firm* — BakerHostetler (57) ABSTRACT

A method for determining an optimal dose of coagulant for raw water includes a step of determining a value, for the raw water, of a first organic parameter; a step of determining a value, for the raw water, of a second mineral parameter; a step of determining a class of water for the raw water, characterized by the value of the first organic parameter and the value of the second mineral parameter; a step of determining a value, for the raw water, of a third organic parameter; a step of defining a target value, for the clarified water, of the third organic parameter; a step of selecting a function between the third organic parameter and an added dose of coagulant, said function being selected for the class of water and for the value, for the raw water, of the third organic parameter; a step of using the function to determine a first dose of coagulant in order to reach the target value.

18 Claims, 7 Drawing Sheets

(52) U.S. Cl.
CPC ...... *C02F 2209/06* (2013.01); *C02F 2209/07* (2013.01); *C02F 2209/11* (2013.01); *C02F 2209/21* (2013.01)

(58) Field of Classification Search
CPC ............. C02F 2209/07; C02F 2209/11; C02F 2209/21; C02F 2209/005; C02F 2209/08; G01N 33/18; G06Q 10/04
USPC ......................................................... 210/709
See application file for complete search history.

(56) References Cited

FOREIGN PATENT DOCUMENTS

| WO | WO 2009/002192 A1 | * | 12/2008 | ............ G01N 33/18 |
| WO | 2013/093217 A1 | | 6/2013 | |
| WO | WO 2013/093217 A1 | * | 6/2013 | ................ C02F 1/00 |
| WO | 2014/208871 A1 | | 12/2014 | |
| WO | WO 2014/208871 A1 | * | 12/2014 | ................ C02F 1/00 |

OTHER PUBLICATIONS

Critchley, et al., "Automatic Coagulation Control at Water-Treatment Plants in the North-West Region of England", Water and Environment Journal, vol. 4(6), pp. 535-543, 1990.
Kim, et al., "MLP, ANFIS, and GRNN based real-time coagulant dosage determination and accuracy comparison using full-scale data of a water treatment plant", Journal of Water Supply: Research and Technology—Aqua, vol. 66 (1), pp. 49-61, 2017.

* cited by examiner

METHOD FOR DETERMINING A DOSE OF COAGULANT FOR TREATING RAW WATER

CROSS-REFERENCE TO RELATED APPLICATIONS

This application is a National Stage of International patent application PCT/EP2019/068899, filed on Jul. 12, 2019, which claims priority to foreign French patent application No. 1856456, filed on Jul. 13, 2018, and FR 1859025, filed Sep. 28, 2018, the disclosures of which are incorporated by reference in their entireties.

FIELD OF THE INVENTION

The invention is located in the field of the treatment of water, and more specifically of coagulation for removing the organic matter from raw water. In particular, the invention relates to a method for determining a coagulant dose to be added to raw water for removing the organic matter. The invention further concerns a computer tool implementing a method for determining a coagulant dose. The invention likewise concerns a process of water treatment by coagulation.

BACKGROUND

Coagulation (or coagulation-flocculation) is a known water treatment process enabling the removal of the suspended matter and the organic matter that the water contains. This treatment can be applied to wastewater, river water and, more generally, any type of water.

Generally speaking, a first step is carried out by adding coagulant, usually metal salts, to an inflow water which is termed "raw water" (EB). In general the raw water is introduced into a reactor or a basin, and the coagulant is added to said reactor or basin. A second step then involves agglomerating the coagulated particles, usually by means of a polymer. Lastly, a third step of settlement of the particles allows the particles to be separated off. At the end of these steps, the resulting outflow water is termed "clarified water" (ED).

However, raw water may be subject to rapid variations in quality because of climatic conditions or human activity. These variations modify not only the physicochemical properties of the water but also the composition of the organic matter. It is therefore necessary to modify the coagulant dose to be used, in order to adapt the treatment of the raw water. The reason for this is that the coagulant dose to be used is dependent on the turbidity and on the organic matter, a complex matrix of organic substances which is commonly present in surface water and ground water, and more broadly in all types of water. This matrix may be due to the origin of the water or else to pollution, for example by catchment basin drainage. Furthermore, seasonal variations, pH, and other external parameters may influence the quantity or the quality of the organic matter.

The degree of elimination of the organic matter is linked to its quality, which is therefore very variable and which is difficult to anticipate.

Carrying out laboratory assays, typically jar tests, is presently the most reliable way of determining the optimal treatment conditions, and especially the coagulant dose and the coagulation pH, for eliminating the turbidity and the organic matter. The coagulation pH is a pH adjusted in order to enhance the efficacy of the coagulant. The adjustment of the pH is made in general in the reactor or the basin to which the coagulant is introduced, generally by adding acid to the reactor or the basin. However, these assays are time-consuming and impossible to carry out continuously in order to be able to respond to the needs of the operating companies, especially in cases of rapid variation in quality of the raw water.

In general, therefore, the operators use excess coagulant doses so as to guarantee that the quality objective is met, adopting a safety margin. This overdosing gives rise, disadvantageously, to extra operating expenses, in terms both of reagent costs and of the cost of treating the sludges, given the greater quantities of sludges that are generated.

In order to overcome this problem, there are systems in place which enable determination of a coagulant dose to be injected so as to attain a desired objective in quality of the water leaving the coagulation. These systems are of two types:
  feedback-controlled system: the coagulant dose is regulated relative to the quality of the water exiting the coagulation process;
  predictive system: the coagulant dose is defined relative to the quality of the water entering the coagulation process (parameters used: turbidity, UV absorbance at 254 nm, total organic carbon TOC, etc.).

The feedback-controlled systems include a system which utilizes zeta potential in order to monitor and optimize coagulation (Critchley et al., *Automatic coagulation control at water-treatment plants in the north-west region of England*, 1990). The zeta potential enables the charge of the water to be measured, with the aid, for example, of an SCD (Streaming Current Detector) analyzer. According to the physicochemical mechanisms of the coagulation, the optimal point of the coagulation corresponds to a zeta potential of 0. However, the rapid variations in flow rate and the non-optimized mixing conditions may give rise to responses which are unstable and therefore to results which are of low reliability. Moreover, the measurement is sensitive to a change in pH and in mineralization, and the analyzer must be calibrated frequently to compensate for these modifications. The result is a relatively unreliable system. Lastly, the system fails to take account of the objective of desired water quality at the end of the coagulation, an objective which may vary depending on the steps downstream of the coagulation, and especially depending on the expected performance levels of these steps.

The predictive systems include models based on data histories. These models may use artificial intelligence such as an artificial neural network, the network being supplied with historical data from a plant, and optionally with data obtained from sensors (for characterizing, typically, the quality of the water at various stages in a treatment process). The artificial intelligence of the system learns from the events of the past, allowing it to update the calculation rules in order to obtain the best response from the model.

The models include models with classical regression, referring to classic linear, quadratic, logarithmic and exponential equations. The parameters which enable calculation of the coagulant dose are defined on the basis of data histories. However, the accuracy of these models is not very good, since they are based on simple equations, whereas the coagulation phenomena are complex phenomena.

The models include other, more complex models, as described in the publication '*MLP, ANFIS, and GRNN based real-time coagulant dosage determination and accuracy comparison using full-scale data of a water treatment plant*', Chan Moon Kim and Manukid Parnichkun, Journal of Water Supply, Research and Technology—AQUA—66.1-2017. The model is based on a set of thousands of data points, obtained from plant histories, in order to define the best statistical model enabling calculation of the optimal coagulant dose for eliminating turbidity. The 3 modes of artificial intelligence studied (MLP, ANFIS and GRNN) show a response which is suited to the results observed in the plant, and the combination of the 3 tools enables the accuracy of the model to be enhanced over a wide range of raw water turbidity (from 0 to 450 NTU).

The major drawback of these models based on data histories is that they are specific to each site. Moreover, it is not possible to carry out true optimization of the coagulant dose, given that the model is based on former data and not on the quality of the water prior to treatment. Furthermore, these history-based models can only reproduce the past, and not optimize it. They indicate the coagulant dose to be injected as was done in the past, without guaranteeing that this is the optimal dose for delivering a compliant water at the best cost.

Other more complex models may make use of the results of laboratory tests, such as jar tests, on a wide variety of water. These results are used in order to define equation constants which determine a quantity of coagulant to be used depending on the quality of the incoming water.

As an example, an optimization model named mEnCo (Modelization of ENhanced COagulation) was developed in Australia by the Australian Cooperative Research Centre for Water Quality and Treatment. Mathematical equations give relationships between the dissolved organic carbon (DOC) and the coagulant dose. The constants integrated in these equations have to be determined using results of jar tests obtained from a wide variety of Australian waters. Although the mEnCo model provides good results over a number of Australian plants, it remains the case that this model is still highly specific to one plant, or at least to one type of raw water.

Another type of predictive model is described in the publication 'Predicting DOC removal during enhanced coagulation', Edwards, Journal—American Water Works Association, 89(5), 78-89, 1997, which presents a coagulation model based on the laws of adsorption applied to the removal of the organic matter. The algorithm of the model describes the physicochemical phenomena during coagulation. The Edwards model was improved by Kastl et al. (2004), who divided the organic matter into 3 fractions:
the fraction not adsorbable on metal hydroxides (fraction inert to coagulation),
the polar fraction which can be removed by coagulation as a function of the coagulant dose and the coagulation pH,
the nonpolar fraction, which can be removed by coagulation only as a function of the coagulant dose.

The model is based on 5 equations with 5 unknown parameters for determining the constants which allow the model to operate: the maximum sorption capacity, the adsorption constant, the fraction of humic acids, the nonpolar fraction, and the pKa of the humic acids. These 5 parameters are determined by carrying out jar test assays under specific conditions (coagulation dose and coagulation pH). These 5 parameters are dependent on the organic matrix (charge, hydrophobicity, size, type, etc.) and must therefore be determined for each type of organic matrix.

The input and output data are described below, with two possible options: input: organic matter content (DOC) of the raw water+coagulation pH+DOC objective to be attained in clarified water=>output: coagulant dose;

input: organic matter content (DOC) of the raw water+coagulation pH+coagulant dose=>output: DOC content of the clarified water.

However, the Edwards and Kastl models present the following drawbacks: the model is specific to each site, and the constants allowing the model to be adapted have to be determined by way of time-consuming laboratory assays.

From these various examples, it is understood that: either the models are based on the statistical study of data histories for defining the constants in the equations allowing the calculation of the coagulant dose: in that case, there is no possible optimization;
or the models are based on laboratory assays for defining the constants in the equations allowing the calculation of the dose: in that case, the implementation of the models is time-consuming.

Moreover, these models are in general specific to one plant, or at least to one type of raw water.

Lastly, these systems in general lack accuracy.

A more accurate system was therefore developed, as described in patent application WO2009002192, which describes methods for calculating chemical dose for treating raw water, by considering the turbidity of the water as a measure of particulate content, and also the ultraviolet absorbance (UV absorbance) of the water and the dissolved organic carbon (DOC) as a measure of the organic matter dissolved in the raw water. Through these measurements it is possible to predict a dose of chemical to be added to the water, employing in particular the sum of the particulate content and of the content of dissolved organic matter.

Nevertheless, the accuracy of these methods is in need of improvement so as to use the smallest possible quantity of coagulant while obtaining a maximum coagulation effect.

Moreover, a method of this kind still lacks accuracy, since the constants in the model are determined empirically and/or experimentally, and not chemically. They fail to take account, indeed, of all the parameters essential for estimating the quality of the water, which affect particularly the coagulation performance levels.

SUMMARY OF THE INVENTION

The invention is aimed at overcoming the drawbacks of the prior-art methods and systems for coagulant dosing.

The invention is directed to a method which enables optimization of the quantity of coagulant to be used for the treatment of the water—which, in other words, enables determination of an optimal coagulant dose while avoiding especially the overdosing of coagulant.

The search is therefore for a method which allows a more accurate, reliable and optimal quantity of coagulant to be obtained, for use in a raw water, this method being rapid, simple and effective, and not specific to one site and/or to one type of given raw water.

A first subject of the invention is a method for determining an optimal dose of coagulant for raw water, comprising the following steps:
a step of determining a value, for the raw water, of a first organic parameter for providing information on the ability of a water to coagulate;
a step of determining a value, for the raw water, of a second mineral parameter for providing information on the mineral load of a water;
a step of determining a class of water, for the raw water, as a function of the values, determined for the raw water, of the first organic parameter and of the second mineral parameter, a class of water being characterized by a first range of values of the first, organic parameter and a second range of values of the second, mineral parameter;

a step of determining a value, for the raw water, of a third organic parameter, said third parameter being for providing information on the quantity of organic matter in a water;

a step of defining a target value, for the clarified water, of the third organic parameter;

a step of selecting a function for establishing a relationship between the third organic parameter and a dose of coagulant added to the raw water, said function being selected for the class of water determined for the raw water and for the value, determined for the raw water, of the third, organic parameter;

a step of using the function selected, so as to determine a first dose of coagulant corresponding to the target value, defined for the clarified water, of the third organic parameter.

In this case, the optimal coagulant dose is the first coagulant dose.

Throughout the description, the raw water (EB) is defined as being the inflow water (upstream) of the coagulation process, and the clarified water (ED) as being the outflow water (downstream) of the coagulation process.

Throughout the description, organic matter refers to the dissolved organic matter, in contrast to the turbidity, which is directed to the particulate content or suspended matter in the water.

The invention is therefore directed to a method which determines an optimal coagulant dose:

by integrating the performance levels of the steps downstream of the coagulation process (for example, step of ozonation or filtration on granular activated carbon), and by then defining the dose "strictly" necessary for the objective to be attained in clarified water, by considering at least one organic parameter and at least one mineral parameter of the raw water, by using classes of water, each class of water being characterized by at least one first range of values of at least one first, organic parameter (providing information on the ability of a water to coagulate) and a second range of values of at least one second, mineral parameter (providing information on the mineral load of a water), by determining the class of water of the raw water according to the organic and mineral parameters, by using, for the class of water determined, functions enabling a connection between a first coagulant dose and the organic matter present in the raw water, and for attaining the objective in clarified water.

In each class of water, such functions are preferably available in at least one database which is capable of providing, for each class of water and for given values, for the raw water, of the third, organic parameter, a function which is capable of establishing a relationship between the third, organic parameter and a coagulant dose added to the raw water.

A database is defined in the present description as a storage space (container, memory, etc.).

The database may be supplied with assays on various waters.

It may be supplied during the use of the method.

The water classes allow the raw waters to be classified in more or less well-defined categories, depending on criteria which are used for determining these classes of water.

The classes of water allow at minimum the taking into account of at least one parameter of minerality of the raw water.

Furthermore, the method may incorporate the effect of the coagulation pH, as explained hereinafter.

Moreover, the method may incorporate the search for the combination of reagents (especially between a coagulant dose and a powdered activated carbon dose and/or an acid dose) which is the least expensive for attaining the set objective, as explained hereinafter.

The determination of the classes of water may comprise the use of classes of water which have already been determined—stored, for example, in a database.

The method according to the invention enables a more accurate and more correct quantity of coagulant to be obtained for use in a raw water, this quantity not being specific to one site, but being established as a function of the characteristics of the water to be treated.

According to one embodiment, the at least one first, organic parameter is selected from the UV absorbance, preferably at 254 nm, the dissolved organic carbon, the ratio between the UV absorbance, preferably at 254 nm, and the DOC (dissolved organic carbon), or a combination of said parameters. The UV absorbance provides a more simple measurement, and in general a more cost-effective one, than the measurement of the DOC.

According to one embodiment, the method comprises the combination of the measurement of the UV absorbance with the determination of the DOC.

According to one embodiment, the at least one second, mineral parameter is selected from the complete alkalimetric titer, the concentration of chloride ions, the concentration of sodium ions, the concentration of sulfate ions, the concentration of calcium ions, the concentration of magnesium ions, the concentration of silicate ions, the conductivity, or a combination of said parameters.

The second, mineral parameter preferably comprises several mineral parameters, typically the complete alkalimetric titer, the concentration of chloride ions and/or the concentration of sodium ions.

According to one embodiment, the third, organic parameter is selected from the UV absorbance, preferably at 254 nm, or the DOC. The UV absorbance provides a more simple measurement, and in general a more cost-effective one, than the measurement of the DOC.

According to one advantageous embodiment, the method further comprises a step of determining the coagulation pH, the function being selected also for the coagulation pH.

This enables a first optimal coagulant dose to be obtained, by simulating different coagulation pH values, to find out, in particular, the optimal coagulation pH.

Where the functions are available in at least one database, this database is able to provide—for each class of water, for given values, for the raw water, of the third, organic parameter, and for coagulation pH values—a function for establishing a relationship between the third, organic parameter and a coagulant dose added to the raw water.

According to one embodiment, the method further comprises a preliminary step of determining a plurality of classes of water, each class of water being characterized by at least one first range of values of at least one first, organic parameter for providing information on the ability of a water to coagulate, and a second range of values of at least one second, mineral parameter for providing information on the mineral load of a water.

When the classes of water are stored in a database, said database may therefore be supplied during use of the method.

A class $CL_i$ of water is, for example, a collective of raw waters for which the relationship between the noncoagulable organic matter of a raw water and the value ($P_{ORG3\_EB}$), for the raw water, of the third, organic parameter ($P_{ORG3}$) is defined by a collective of first linear relationships $R_{i1}$.

A class $CL_i$ of water is also, for example, a collective of raw waters for which the relationship between the noncoagulable organic matter of a water and the coagulation pH $pH_C$ is defined by a second linear, exponential or polynomial relationship Rig, for example a second-degree polynomial.

A class $CL_i$ of water is also, for example, a collective of raw waters for which the relationship between the DMEA and the value, for the raw water, of the third, organic parameter $P_{ORG3}$ is defined by a collective of third linear relationships Ria, and for which the DMEA is independent of the coagulation pH $pH_C$.

The DMEA is defined in the present description as being the coagulant dose on the basis of which the cost of treatment with the coagulant becomes greater than the cost of the treatment by an alternative, generally more expensive, reagent (powdered activated carbon "CAP" as an example) for the same reduction in organic matter by coagulation, expressed as UV absorbance.

The various steps of the method, especially the various steps described below, are preferably implemented in a program, thereby providing a rapid, simple and effective method which provides the correct coagulant dose, calculated in real time, and even allows the optimal coagulant dose to be adjusted in-line.

According to one preferred embodiment, the function is an exponential function for the collective of the classes of water, of the following type:

$$y = Ae^{-B[x]} + C;$$

where y is the third, organic parameter, and x is the quantity of coagulant, and where the coefficients A, B and C can be determined by given relationships according to the class of water, for a value, for the raw water, of the third, organic parameter, and for a coagulation pH.

In other words, the function is of the same type for all classes, but the coefficients of this function are different according to the classes. Moreover, these coefficients are determined, for one class of water, by relationships which give said coefficients as a function of characteristics of the raw water and/or of the coagulation pH.

According to one particular embodiment, the coefficient C is defined as being the value of noncoagulable organic matter, for the given value, for the raw water, of the third, organic parameter, and for a given coagulation pH.

According to one particular embodiment, the coefficient C is connected to the value, for the raw water, of the third, organic parameter by first linear relationships.

According to one particular embodiment (alternative or complementary to the preceding embodiment), the coefficient C is connected to the coagulation pH by a second, linear, polynomial or exponential, relationship.

According to one particular embodiment, the coefficient A is equal to the value, determined for the raw water, of the third, organic parameter, minus the coefficient C.

According to one particular embodiment, the coefficient B is deduced from a second derivative value of the function, from the coefficient A and from the value, determined for the raw water, of the third, organic parameter. For example, the second derivative value of the function is between 0.0001 and 0.0009.

According to one particular embodiment, the second derivative value of the function is attained for a coagulant dose equal to a maximum economically allowable dose, said maximum economically allowable dose being the coagulant dose on the basis of which the cost of treatment with the coagulant becomes greater than the cost of the treatment by an alternative reagent, and being determinable by third, linear relationships as a function of the value, determined for the raw water, of the third, organic parameter.

The first and/or second relationships and/or the third relationships are preferably available, for each class of water, in a database.

Said database may be supplied by assays on various waters.

It may be supplied during the use of the method.

According to one embodiment, the values, for the raw water, of the first, organic parameter, of the second, mineral parameter and of the third, organic parameter are determined by measurements of the raw water, for example in-line measurements formed by a dissolved organic carbon sensor (with preferably a prefiltration step), a UV sensor (with preferably a prefiltration step), a conductivity sensor, or sampling measurements performed by a complete alkalimetric titer analyzer, an ion concentration analyzer, or a combination of such measurements.

Such sensors may also advantageously monitor the quality of the water all along the water treatment process (not only for the raw water, but also for the clarified water, and even for the treated water, as explained hereinafter in the present description).

The calculated optimal dose may be added automatically in a process of treatment by coagulation/settlement.

According to one embodiment, the method further comprises determining a dose of a second reagent, for example a powdered activated carbon or an acid, or even another coagulant, and determining a first coagulant dose to be added to attain the target value, defined for the clarified water, of the third, organic parameter with the second reagent.

Advantageously, the method comprises a step of comparing a first coagulant dose determined with the second reagent, with a first coagulant dose determined without the second reagent. This provides knowledge as to whether it is more advantageous to add a second reagent, or to apply more coagulant, or to calculate the best balance between the coagulant and the second reagent.

According to one advantageous embodiment, the method further comprises:
 a step of defining a target turbidity value for the clarified water;
 a step of determining a second coagulant dose to be added to the raw water for attaining the target turbidity value for the clarified water;
 a step of determining the optimal coagulant dose to be added to the raw water, comprising the comparison of the first coagulant dose and the second coagulant dose, said optimal coagulant dose being the greatest dose between the first coagulant dose and the second coagulant dose.

The advantage is to adapt to the variations in quality of the raw water, whether the organic matter or the turbidity is predominant.

Relative to the methods known from the prior art for determining an optimal coagulant dose, in which the coagulant dose is a function of the turbidity and of the organic matter, the method according to this embodiment of the invention determines the coagulant dose which is strictly necessary, in other words without overdosing, while enabling the objectives to be met in terms of water quality at the end of coagulation.

The inventors have determined that this method allows a reduction in the turbidity and the organic matter in the raw water in parallel. The reason is that it allows the parallel exploitation of the two following chemical functions of the coagulant:

for the turbidity: the neutralization of surface charges (well known to the skilled person);

for the dissolved organic matter: adsorption with metal hydroxides (described, for example, in the "Edwards and Kastl" publication cited earlier on).

A second subject of the invention is a computer tool implementing the method for determining the optimal coagulant dose according to the first subject of the invention.

A third subject of the invention is a raw water treatment process comprising at least a step of coagulation of the raw water, the coagulant dose added being the optimal coagulant dose, determined by the method for determining the optimal coagulant dose according to the first subject of the invention.

BRIEF DESCRIPTION OF THE DRAWINGS

The invention will be better appreciated, and other advantages will become apparent, on a reading of the detailed description which is given by way of example and without limitation, the description being illustrated by the appended figures, in which.

DETAILED DESCRIPTION

In the description, the invention is described with the example of raw water. However, the invention can be applied to any other liquid containing organic matter and turbidity.

Figure 1:
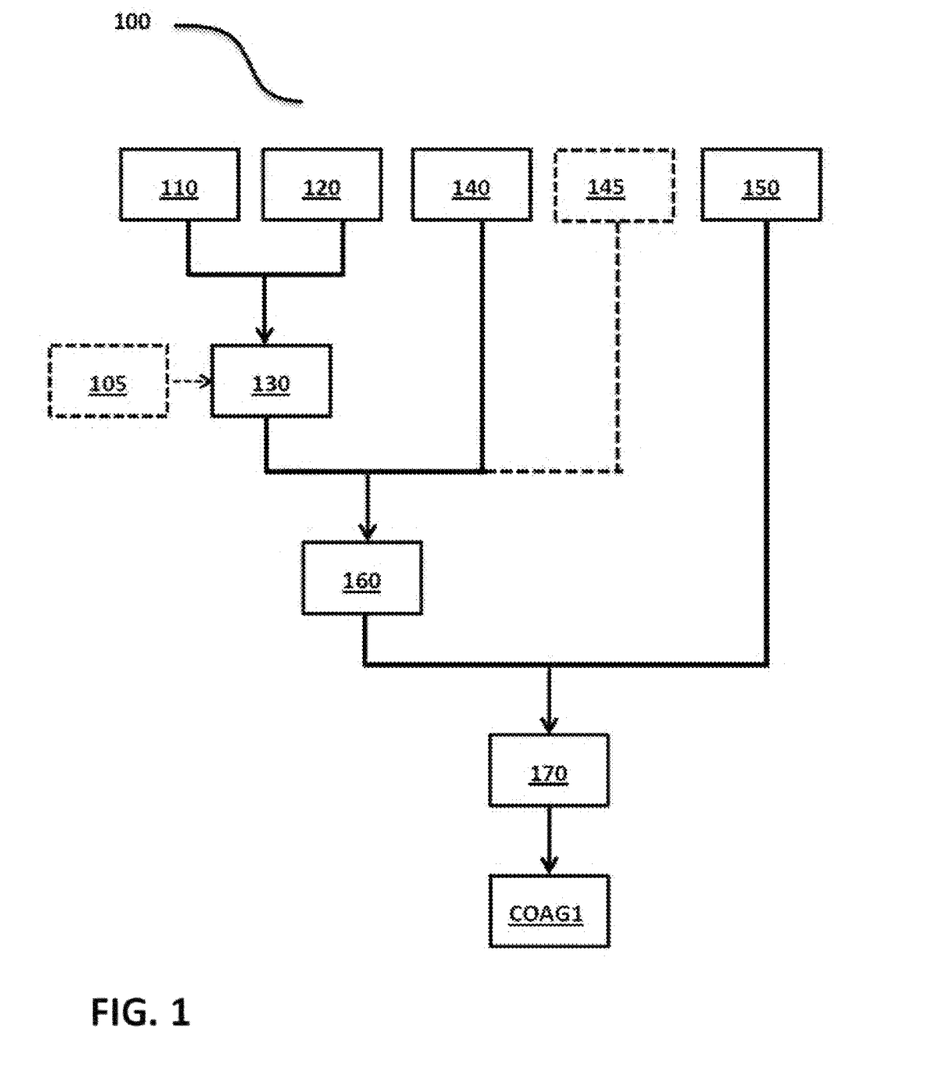
FIG. 1 illustrates a first embodiment of the method of the invention for determining the optimal coagulant dose.

FIG. 1 illustrates a first embodiment of a method for determining the optimal dose of coagulant to be added to the raw water, the method comprising the following steps, which are also described subsequently:

a step 110 of determining, for the raw water, a value ($P_{ORG1\_EB}$) of a first, organic parameter ($P_{ORG1}$) for providing information on the ability of a water to coagulate;

a step 120 of determining, for the raw water, a value ($P_{MIN2\_EB}$) of a second, mineral parameter ($P_{MIN2}$) for providing information on the mineral load of a water;

a step 130 of determining, for the raw water, a class of water ($CL_{EB}$) as a function of the values, determined for the raw water, of the first, organic parameter and of the second, mineral parameter, a class of water being characterized by a first range of values of the first, organic parameter ($P_{ORG1}$) and a second range of values of the second, mineral parameter ($P_{MIN2}$);

a step 140 of determining, for the raw water, a value ($P_{ORG3\_EB}$) of a third, organic parameter ($P_{ORG3}$), said third parameter being for providing information on the quantity of organic matter in a water;

a step 150 of defining, for the clarified water, a target value ($P_{ORG3\_ED}$) of the third, organic parameter ($P_{ORG3}$);

a step 160 of selecting a function ($f_i$) for establishing a relationship between the third, organic parameter ($P_{ORG3}$) and a dose of coagulant ([COAG]) added to the raw water, said function being selected for the class of water ($CL_{EB}$) determined for the raw water and for the value ($P_{ORG3\_EB}$), determined for the raw water, of the third, organic parameter ($P_{ORG3}$);

a step 170 of using the function ($f_i$) selected, so as to determine a first dose of coagulant ([COAG1]) corresponding to the target value ($P_{ORG3\_ED}$), defined for the clarified water, of the third, organic parameter ($P_{ORG3}$).

According to this embodiment, the optimal dose is the first coagulant dose.

According to one particular embodiment example, the third, organic parameter $P_{ORG3}$ is the UV absorbance at 254 nm of the clarified water, expressed in m⁻¹. It may be called "UV" throughout the description.

The UV absorbance (typically UV at 254 nm) is a physical measurement for evaluating the aromatic organic matter contained within the water. The UV absorbance is measured by means of the UV photometer (typically at 254 nm), where the sample is placed in a UV-transparent quartz cell with a thickness in the cm range—for example, of 1 cm, 3 cm, 5 cm or 10 cm. The measurement is simpler and in general more cost-efficient than the measurement of TOC (Total Organic Carbon) and even than DOC (Dissolved Organic Carbon). This method by photometry gives a result in m⁻¹, corresponding to the loss of luminous intensity at the selected wavelength (typically 254 nm) through a sample of water in the cell with a thickness of 1 cm. The organic matter thus detected contains aromatic rings and double bonds, such as, especially, humic acids. These aromatic organic substances are particularly effectively removed by coagulation.

According to another embodiment example, it is possible to measure the DOC, which will also be a function of the coagulant dose.

For each class of water $CL_i$, the UV or the DOC is a function ($f_i$) of the coagulant dose.

To facilitate reading, the remainder of the description will use the term UV absorbance or UV, with the proviso that the measurement in question may alternatively be of DOC or of another third, organic parameter.

The various steps are described more later in the description.

There may additionally be a preliminary step 105 of determining a plurality of classes of water.

There may additionally be a step 145 of determining the coagulation pH, with the function $f_i$ being selected, moreover, for the coagulation pH.

Other steps, not shown in FIG. 1, may be added. They are described in particular in the remainder of the description.

Figure 2:
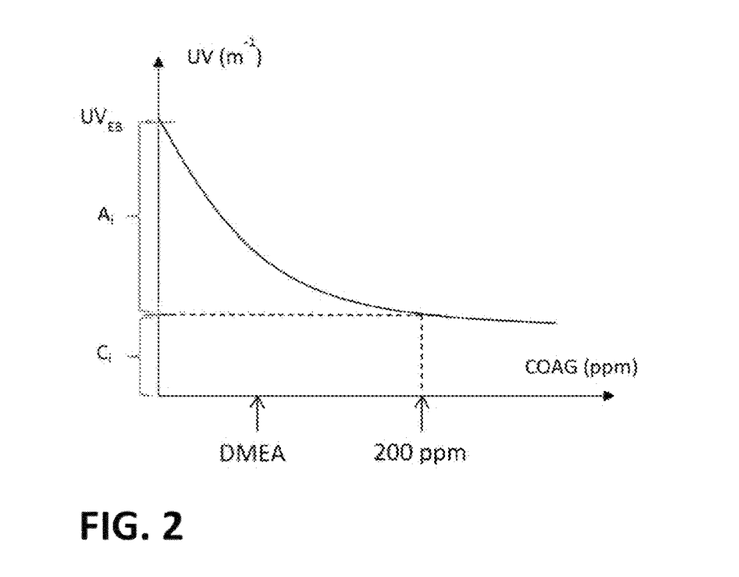
FIG. 2 represents a function enabling calculation of the UV absorbance of a water as a function of the injected coagulant dose.

FIG. 2 illustrates the preferred embodiment wherein the function $f_i$ selected during the selection step 160 is an exponential function:

$$\text{UV or DOC} = f_i([\text{COAG}]) = A_i e^{-B_i[\text{COAG}]} + C_i \quad (1)$$

where COAG is the coagulant dose added, expressed in ppm.

The step 160 of selecting the function $f_i$ then comprises a step of determining the coefficients $A_i$, $B_i$, $C_i$.

The coefficient $C_i$ corresponds to the residual organic matter expressed in terms of UV absorbance (also called "residual UV" in the present description or "noncoagulable UV") when the coagulant dose has reached a maximum efficiency threshold, typically when the coagulant dose is greater than 200 ppm of solution, expressed as ppm of commercial solution.

$A_i$ corresponds to the organic matter, expressed for example in terms of UV absorbance, which is removed by coagulation when the coagulant dose has reached a maximum efficiency threshold, typically when the coagulant dose is greater than 200 ppm of solution, expressed as ppm of commercial solution.

Moreover, $A_i$, $C_i$ and $UV_{EB}$ are connected by the following equation:

$$UV_{EB} = A_i + C_i \quad (2)$$

where $UV_{EB}$ is the organic matter in the raw water, expressed in terms of UV absorbance.

$B_i$ is a coefficient which gives the nature of the exponential function.

$A_i$, $B_i$ and $C_i$ are obtained by relationships given for each class of water $CL_i$, and these relationships $R_{i1}$, $R_{i2}$ and $R_{i3}$ enable $A_i$, $B_i$ and $C_i$ to be deduced from the coagulation pH ($pH_C$) and from the organic matter in the raw water ($UV_{EB}$), expressed in terms of UV absorbance. These relationships are preferably available in databases associated with the classes of water.

To select the function $f_i$, and especially to determine the coefficients in the case of an exponential function of formula (1), it is necessary to determine (determination step 130) the class of water to which the raw water belongs.

According to one preferred embodiment example, a raw water is identified in a class of water by the analysis of its following organic and mineral matrices:

the organic matrix is defined by the following parameters:
SUVA (which is the ratio between the UV absorbance at 254 nm, expressed in $m^{-1}$, and the DOC, expressed in mg/l) and, optionally, the measurement of the DOC by liquid chromatography (LC-OCD for Liquid Chromatography-Organic Carbon Detection);
the mineral matrix is defined by the following parameters: the complete alkalimetric titer (TAC), the concentration of chloride ions and/or of sodium ions, and optionally the conductivity, the concentration of silicate ions, of calcium ions, of magnesium ions, of sulfate ions, and the ionic balance.

The values of the parameters of the organic and mineral matrices (determination steps 110 and 120) may be determined by in-line analysis or by sampling, or may comprise recovery of data already available for the raw water to be treated.

According to the preferred embodiment example, the first, organic parameter ($P_{ORG1}$) therefore comprises at least the SUVA, and the second, mineral parameter ($P_{MIN2}$) therefore comprises at least the TAC, and also the concentration of chloride ions and/or of sodium ions.

Figure 3:
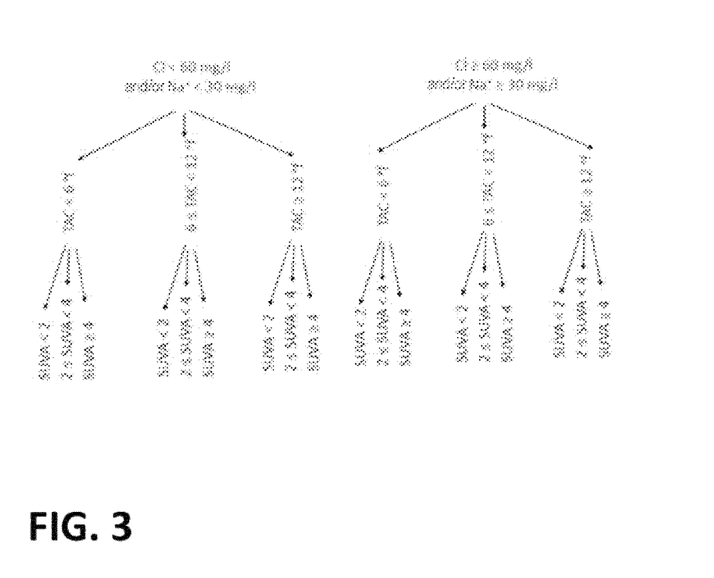
FIG. 3 represents an example of division of waters into classes of water, defined as a function of the concentration of Cl⁻ and Na⁺ ions, of the complete alkalimetric titer (TAC) and of the ratio $UV_{254\,nm}/DOC$ (SUVA)

FIG. 3 or table 1 below represents an example of mineral and organic matrices of classes of water, defined as a function of the concentration of $Cl^-$ and/or $Na^+$ ions, the TAC and the ratio $UV_{254nm}/DOC$ (SUVA). The classes of water are defined as a function of the following thresholds:

TABLE 1 examples of mineral and organic matrices of classes of water

| | Threshold 1 | Threshold 2 |
|---|---|---|
| $Cl^-$ and/or $Na^+$ | 60 mg/l (and/or 30 mg/l) | |
| TAC | 6° F. | 12° F. |
| SUVA | 2 | 4 |

For the class of water $CL_{EB}$ determined for the raw water EB, relationships $R_{EB1}$, $R_{EB2}$ and $R_{EB3}$ are obtained, which are given for said class of water, and said relationships make it possible to deduce the coefficients $A_{EB}$, $B_{EB}$ and $C_{EB}$ from the coagulation pH ($pH_C$) and from the organic matter in the raw water ($UV_{EB}$), expressed in terms of UV absorbance.

Figure 4A:
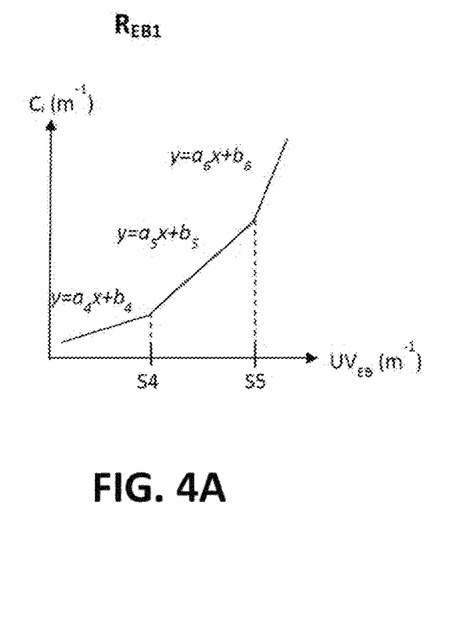
FIGS. 4A and 4B represent first and second relationships enabling calculation of the value of noncoagulable organic matter, as a function of the UV absorbance of the raw water and as a function of the coagulation pH, for one class of water.
Figure 4B:
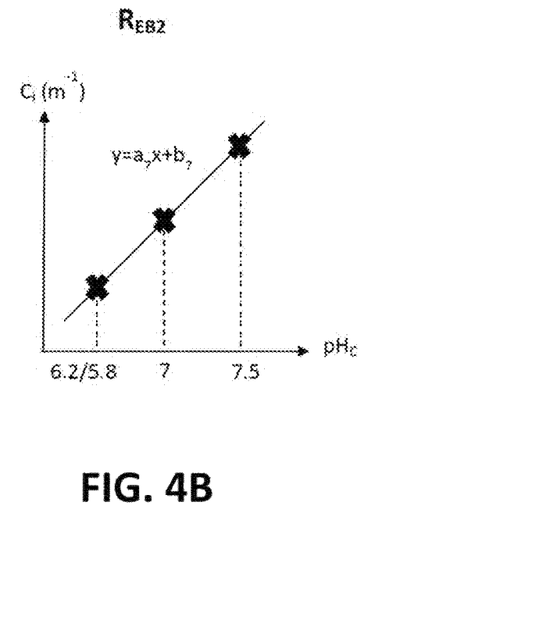

FIGS. 4A and 4B represent the first and second relationships REB, and $R_{EB2}$, from which it is possible to calculate the value of noncoagulable organic matter, this being a function of two variables: the UV absorbance of the raw water (relationships in the form of curves are given for a given coagulation pH) and the coagulation pH (relationships in the form of curves are given for a given value of the UV absorbance of the raw water), for the class of water $CL_{EB}$ determined for the raw water EB. This allows the coefficient $C_{EB}$ to be determined.

To calculate the noncoagulable organic matter as a function of the UV absorbance (or the DOC) of the raw water, there are one or more first, linear relationships $R_{EB1}$ available (three in the example illustrated), with coefficients $a_4$, $a_5$, $a_6$, $b_4$, $b_5$, $b_6$ which vary discretely as a function of thresholds ($S_4$, $S_5$) of the UV absorbance of the raw water, $UV_{EB}$.

FIG. 4A shows three first linear relationships:
$y = a_4 x + b_4$ up to the threshold S4;
$y = a_5 x + b_5$ between the thresholds S4 and S5;
$y = a_6 x + b_5$ after the threshold S5.

Depending on the classes of water, there may be a single first linear relationship or at least two first linear relationships.

To calculate the noncoagulable organic matter as a function of the coagulation pH $pH_C$, there are also second, linear, exponential or polynomial relationships $R_{EB2}$ available, according to the class of water. Said second relationships have coefficients $a_7$, $b_7$, $c_7$, which are also given according to the class of water.

FIG. 4B shows a second, linear relationship of type $y = a_7 x + b_7$.

Depending on the classes of water, the second relationship may alternatively be exponential, $y = a_7 \exp(b_7 x) + c_7$, or polynomial, as for example second-degree polynomial, $y = a_7 x^2 + b_7 x + c_7$.

Therefore, for the class of water $CL_{EB}$ determined, the determination of the UV of the raw water, $UV_{EB}$ (or of the DOC) and of the coagulation pH, $pH_C$, makes it possible to determine the coefficients $a_4$, $a_5$, $a_6$, $b_4$, $b_5$, $b_6$, $a_7$, $b_7$, $c_7$, and then the noncoagulable organic matter, so giving $C_{EB}$.

The coefficients $a_4$, $a_5$, $a_6$, $b_4$, $b_5$, $b_6$ are a function of the coagulation pH.

It would be possible to determine only the coefficients $a_4$, $a_5$, $a_6$, $b_4$, $b_5$, $b_6$ which are given for a fixed, unadjusted coagulation pH.

$A_{EB}$ is obtained via equation (2): $UV_{EB}=A_{EB}+C_{EB}$.

The determination of the UV of the raw water, $UV_{EB}$ (or of the $DOC_{EB}$) (determination step 140) and also the optional determination of the coagulation pH ($pH_C$) (determination step 145) may be carried out by in-line measurement or by sampling, and/or may comprise recovery of data already available for the raw water to be treated.

Also determined is the DMEA (Maximum Economically Allowable Dose) of coagulant.

Figure 5:
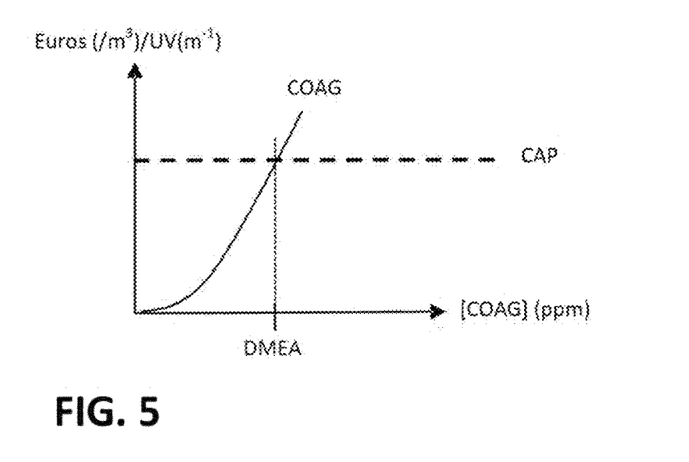
FIG. 5 represents schematically the way of calculating a maximum economically allowable dose of coagulant (DMEA)

The DMEA is defined in the present description as being the coagulant dose at which the cost of treatment with the coagulant becomes greater than the cost of treatment with an alternative, generally more expensive, reagent (as an example, powdered activated carbon, CAP) for the same reduction, by coagulation, in organic matter, expressed in terms of UV absorbance, as is illustrated in FIG. 5, which provides a cost (COST) in euros per cubic meter of raw water and per unit of the organic matter removed, expressed in terms of UV, as a function of the CAP or coagulant (COAG) dose. The dotted line corresponds to the CAP and the solid curve corresponds to the coagulant. The intersection of the two gives the DMEA.

Figure 6:
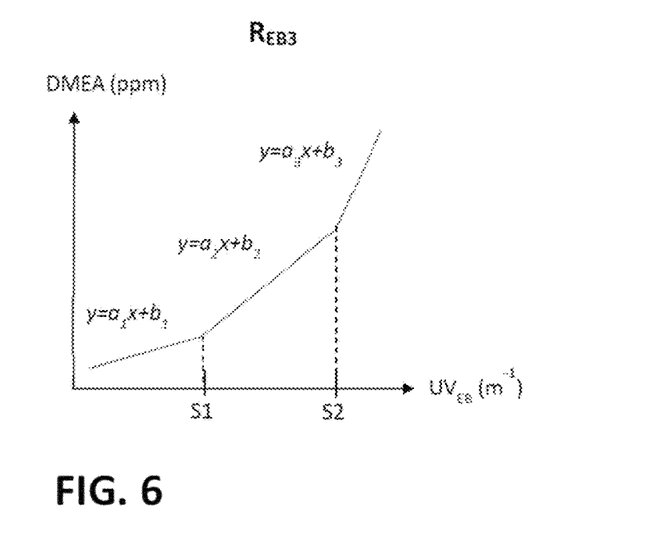
FIG. 6 represents a series of third, linear relationships enabling calculation of the DMEA as a function of the UV absorbance of the raw water, for one class of water.

Furthermore, the inventors have found that the DMEA is independent of the coagulation pH ($pH_C$), but that it is a function of the UV absorbance (or the DOC) of the raw water, as shown in FIG. 6.

FIG. 6 shows a series of third, linear relationships $R_{EB3}$ enabling calculation of the DMEA (given in ppm of commercial solution) as a function of the UV absorbance of the raw water, $UV_{EB}$ (or of the DOC of the raw water, $DOC_{EB}$), for the class of water $CL_{EB}$ determined. There are a number of third, linear relationships, whose coefficients $a_1$, $a_2$, $a_3$, $b_1$, $b_2$, $b_3$ vary discretely as a function of thresholds ($S_1$, $S_2$) of the UV absorbance of the raw water.

Determining the UV of the raw water, $UV_{EB}$ (or of the $DOC_{EB}$) enables determination of the coefficients $a_1$, $a_2$, $a_3$, $b_1$, $b_2$, $b_3$, and then of the DMEA of the raw water.

According to the preferred embodiment of the invention, the DMEA is the coagulant dose corresponding to the point of inflection of the function $f_i$ (1):

$$UV=f_i([COAG])=A_i e^{-B_i[COAG]}+C_i \quad (1)$$

The DMEA is defined mathematically by an absolute value $\alpha_i$ of the second-order derivative of said function, for example of between 0.0001 and 0.0009, i.e.:

$$f''_i([DMEA])=A_i B_i^2 e^{-B_i[DMEA]}=\alpha_i \quad (3)$$

For a given class of water $CL_{EB}$, the value $\alpha_{EB}$ is determined as a function of the value of the UV of the raw water, $UV_{EB}$ (or of the $DOC_{EB}$), as for example as a function of thresholds $\sigma$ of $UV_{EB}$ as set out in table 2 below:

TABLE 2 examples of second derivative values as a function of the UV of the raw water

| $UV_{EB}$ | $[0-\sigma_1]$ | $[\sigma_1-\sigma_2]$ | $>\sigma_2$ |
|---|---|---|---|
| Second derivative value | $\alpha_{EB1}$ | $\alpha_{EB2}$ | $\alpha_{EB3}$ |

For the class of water $CL_{EB}$, and the UV of the raw water $UV_{EB}$ (or the $DOC_{EB}$), the coefficient $B_{EB}$ is determined by the relationship (3), expressed for the raw water.

$$f''_{EB}([DMEA])=A_{EB}B_{EB}^2 e^{-B_{EB}[DMEA]}=\alpha_{EB}$$

Accordingly, for the class of water $CL_{EB}$ determined for the raw water, and the $UV_{EB}$ and the coagulation pH pHc, an exponential function is obtained:

$$UV=f_{EB}([COAG])=A_{EB}e^{-B_{EB}[COAG]}+C_{EB}$$

in which the coefficients $A_{EB}$, $B_{EB}$ and $C_{EB}$ are known.

With this function $f_{EB}$ it becomes possible to calculate:
the residual UV in clarified water ED ("noncoagulable UV"), irrespective of the coagulant dose applied;
the first coagulant dose to be applied in order to reach a target value for the UV absorbance of the clarified water ($UV_{ED}$).

A definition is made (definition step 150) of the target value of the UV absorbance of the clarified water ($UV_{ED}$) or of the DOC value of the clarified water ($DOC_{ED}$), which correspond to the maximum of residual organic matter in the clarified water (ED) desired.

Accordingly, the first coagulant dose is deduced from the function $f_{EB}$ (use step 170).

Moreover, with the first, linear relationships $R_{EB1}$, it is possible to calculate the UV when the coagulant dose is equal to the DMEA (referred to as "$UV_{DMEA}$") so as to decide:

if $UV_{DMEA} \geq UV_{ED}$, then the first coagulant dose=the DMEA;

if $UV_{DMEA} < UV_{ED}$, then the function $f_{EB}$ is used in order to calculate the first coagulant dose.

The coefficients $A_i$, $B_i$ and $C_i$ are given for each type of coagulant.

The coagulant may be a solution based on salts of aluminum or iron, and preferably comprises the following compounds: an aluminum sulfate; an aluminum (poly)chloride; an aluminate; a ferric chloride; a ferric sulfate; a sodium or potassium ferrate ion, or a combination of said compounds. A commercial coagulant solution is, for example, an aluminum sulfate containing 8.2% of alumina $Al_2O_5$, or a ferric chloride containing 41% of $FeCl_3$.

Figure 7:
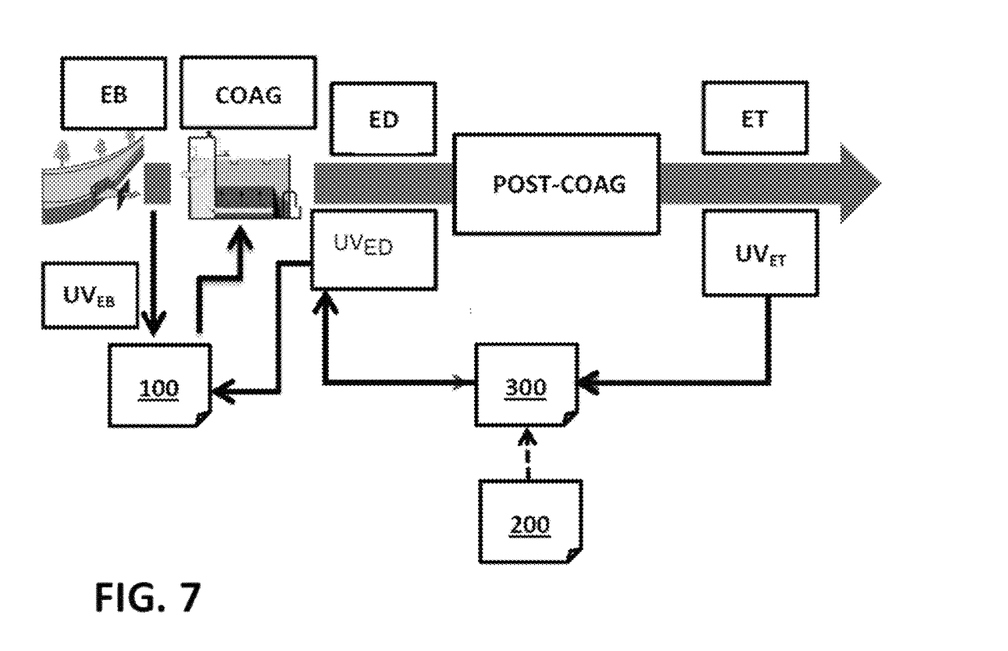
FIG. 7 illustrates a water treatment process comprising a coagulation step and a downstream step.

The target value for residual organic matter in the clarified water may be defined, furthermore, as a function of the steps downstream of the coagulation process; for example, it may be defined, in a step 300, as a function of a target value for residual organic matter in the treated water (ET). The treated water is defined as being the water obtained at the outlet of a water treatment plant.

Therefore, as illustrated in FIG. 7, if the residual organic matter in the treated water is expressed by UV absorbance, and starting from an objective to be met at the plant outlet ($UV_{ET}$) and from the performance in removal of organic matter in the post-coagulation steps (%$_{POST-COAG}$), the quality objective to be met in clarified water is calculated:

$$UV_{ED}=UV_{ET}/(1-\%_{POST-COAG})$$

The post-coagulation performance may be calculated on the basis of in-line sensors or local measurements on the clarified water and the treated water.

According to a step 200, the data harvested from the UV sensors of the clarified water ED and the treated water ET enable calculation of the percentage removal of UV in the post-coagulation treatment steps. With knowledge of this percentage it is possible to calculate the target clarified UV, in the step 300, to enable the objective at the plant outlet (UV of treated water) to be met.

With knowledge of the level of organic matter in the raw water and of the UV objective to be met at the end of coagulation, the method makes it possible to calculate the optimal coagulant dose to be applied in order to achieve the set objectives.

It is possible to implement the method, by using, for example, a tool to install the method (for example, a tool in the form of a computer, tablet, smartphone, Cloud, etc.), without this tool being connected to in-line sensors for measuring the parameters of the raw water. In this case, the values of the parameters of the water are brought into the tool manually, and the dose is, in general, not added automatically in the coagulation/settling treatment process. The tool then contains primarily only the method steps for calculating the optimal coagulant dose. Furthermore, this calculation may take place well before the implementation of the coagulation process. It may be used to calculate a better compromise between different types of coagulants and/or the addition of acid in order to lower the coagulation pH, as is explained more below.

Conversely, it is possible to implement the method by connecting it to in-line sensors or local measurements for measuring the parameters of the raw water, for determining the class of water of the raw water and/or for determining the quantity of organic matter contained in the water during the process and at least for the raw water. Such sensors or local measurements may advantageously monitor the quality of the water in-line, all along the water treatment process. In this case, the calculated optimal dose may be added automatically in the coagulation/settlement treatment process.

To characterize the mineral matrix of the water under study, a TAC analyzer and/or an ion concentration analyzer and/or a conductivity sensor may be used.

The organic matter may be quantified by analyses of UV absorbance at 254 nm and/or DOC (dissolved organic carbon). An in-line sensor selected is preferably a UV sensor, which is easier to operate than an in-line DOC sensor.

At least three in-line sensors, preferably, are installed for determining the quantity of organic matter contained in the water during the process: a first sensor for measuring the raw water, a second sensor for measuring the water after coagulation and settling, and a third sensor for measuring the treated water either before or after the final disinfection.

The data from these sensors may be collated on a Cloud system, which may accommodate the computer tool implementing the method.

The time spacing in the acquisition of the data may be parameterized.

Alert thresholds may be defined in order to manage and warn of sensor drift. These thresholds can likewise be parameterized on a site-by-site basis. They enable especially the creation of alerts which can be notified to the user. This allows the user, in particular, to know whether it is necessary to modify the dosage of the coagulant (or of a second reagent).

The method may further comprise a step of determining a dose of another reagent, as for example powdered activated carbon (CAP), in order to improve the performance of the coagulation/settling process and/or to reach the objective for removal of the organic matter in the clarified water.

The method may furthermore comprise a step of calculating the dose of acid required to obtain a target coagulation pH. This is because it is possible to improve the removal of the organic matter by lowering the coagulation pH, typically by adding acid to the coagulation basin or reactor. The method makes it possible in particular to recover the new coefficients of the function $f_i$ that correspond to this new coagulation pH, and so to recalculate the quantity of coagulant to be added in order to attain the objective for removal of the organic matter in the clarified water.

Figure 8A:
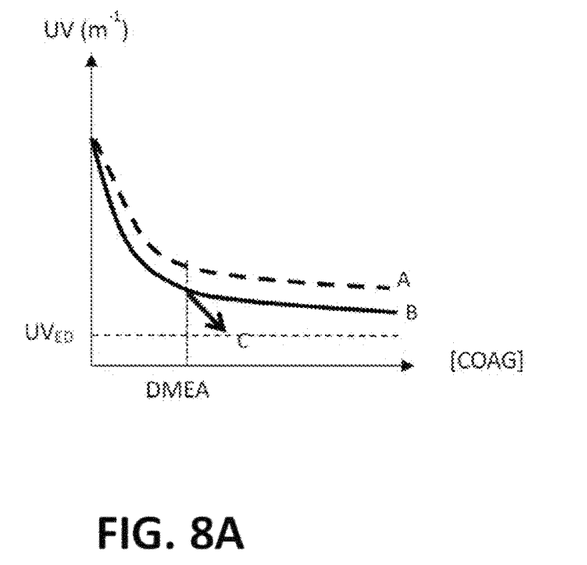
FIGS. 8A and 8B illustrate one particular embodiment of the method for determining a first coagulant dose, enabling the integration of other reagents.
Figure 8B:
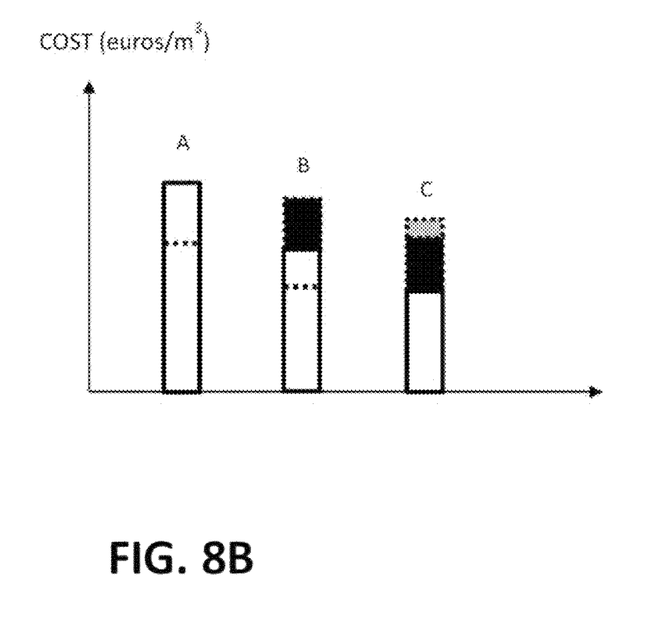

As illustrated in FIGS. 8A and 8B, the method also makes it possible to show the economic benefit of the selection of the combinations of a coagulant, another reagent and/or added acid.

FIG. 8A illustrates the UV of the water as a function of the added dose:
  of coagulant at a pH of 7 (dashed curve A);
  of coagulant at a pH of 6.2 (continuous curve B);
  of coagulant and of CAP to be added (arrow C) when the coagulation pH is 6.2, to attain the target UV of the clarified water.

FIG. 8B indicates the comparative cost of each dosage illustrated in FIG. 8A:
  a histogram corresponding to the curve A, in which the dotted line corresponds to the limit of the DMEA; above the limit of DMEA is the cost of coagulant to be added in order to attain the UV objective of the clarified water;
  a histogram corresponding to the curve B, in which the dotted line corresponds to the limit of the DMEA; beyond the limit of the DMEA is the cost of coagulant to be added in order to attain the UV objective of the clarified water, with addition of the cost of the product to attain the pH of 6.2 (in black);
  a histogram corresponding to the curve C, with the addition of the cost of the product to attain the pH of 6.2 (in black) and the cost of CAP to be added in order to attain the UV objective of the clarified water.

The total cost for attaining the UV objective of the clarified water, including CAP and acid, is in this case lower for attaining the UV objective of the clarified water.

Where acid is added in order to reduce the coagulation pH, the method makes it possible, by recalculating the quantity of coagulant to be added in order to attain the objective for removal of the organic matter in the clarified water, to calculate the drop in quantity of coagulant to be added, the benefit of this difference, and to make a comparison with the cost of added acid. In this way it becomes possible to know whether it is more advantageous to add acid, or to apply more coagulant, or to calculate the best compromise between the two.

Furthermore, where powered activated carbon is added, the method makes it possible, by recalculating the quantity of coagulant to be added in order to attain the objective for removal of the organic matter in the clarified water, to calculate the drop in quantity of coagulant to be added, the benefit of this difference, and to make a comparison with the cost of added CAP. In this way it becomes possible to know whether it is more advantageous to add CAP, or to apply more coagulant, or to calculate the best compromise between the two.

It is possible, moreover, to combine the addition of CAP and the addition of acid, and to calculate the calculation of the economic benefit (or loss) when CAP and acid are added.

Figure 9:
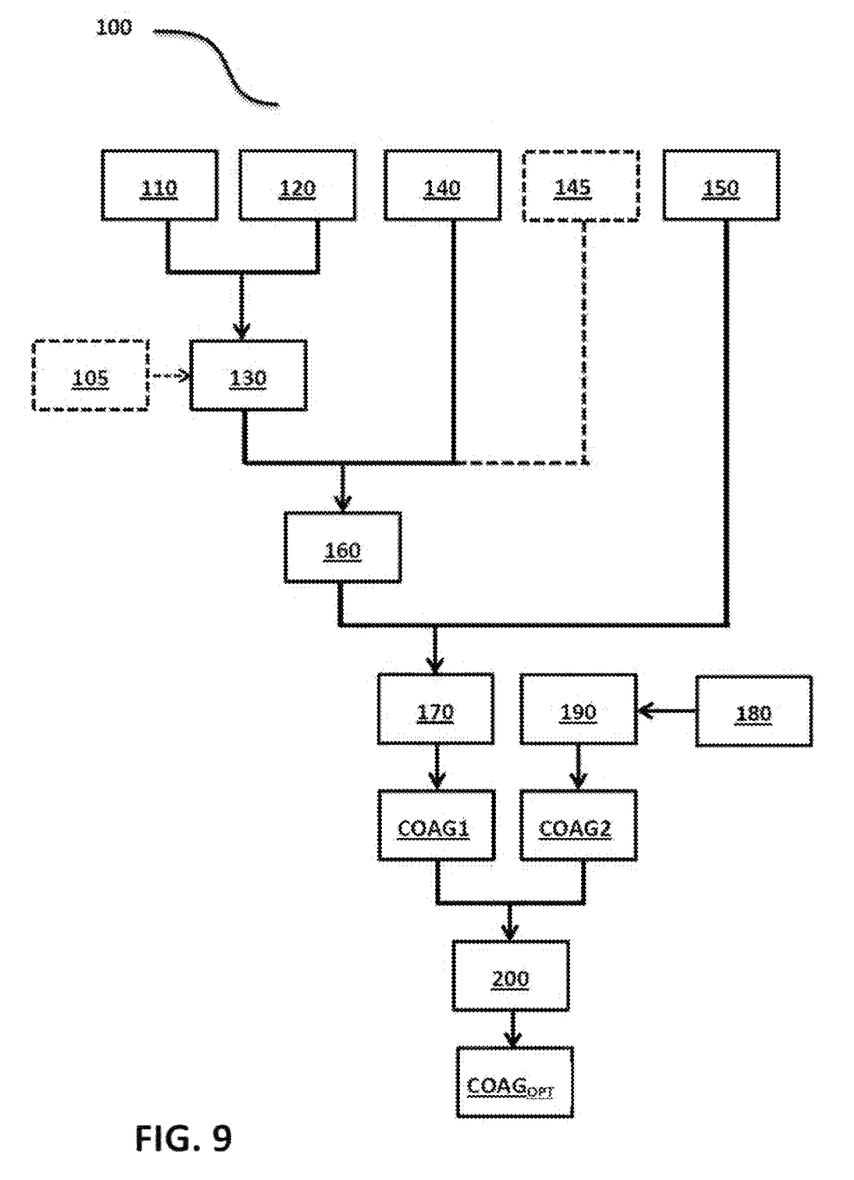
FIG. 9 illustrates a second embodiment of the method of the invention for determining the optimal coagulant dose.

FIG. 9 illustrates another embodiment of the method. In the embodiment illustrated, the method further comprises the following steps:
- a step 180 of defining a target turbidity value ($TURB\_ED$) for the clarified water;
- a step 190 of determining a second coagulant dose ([COAG2]) to be added to the raw water (EB) for attaining the target turbidity value ($TURB\_ED$) for the clarified water;
- a step 200 of determining the optimal coagulant dose ($[COAG]_{OPT}$) to be added to the raw water, comprising the comparison of the first coagulant dose ([COAG1]) and the second coagulant dose ([COAG2]), said optimal dose being the greatest dose between the first coagulant dose ([COAG1]) and the second coagulant dose ([COAG2]).

According to this embodiment, the $3^{rd}$, organic parameter is preferably the UV.

Figure 10:
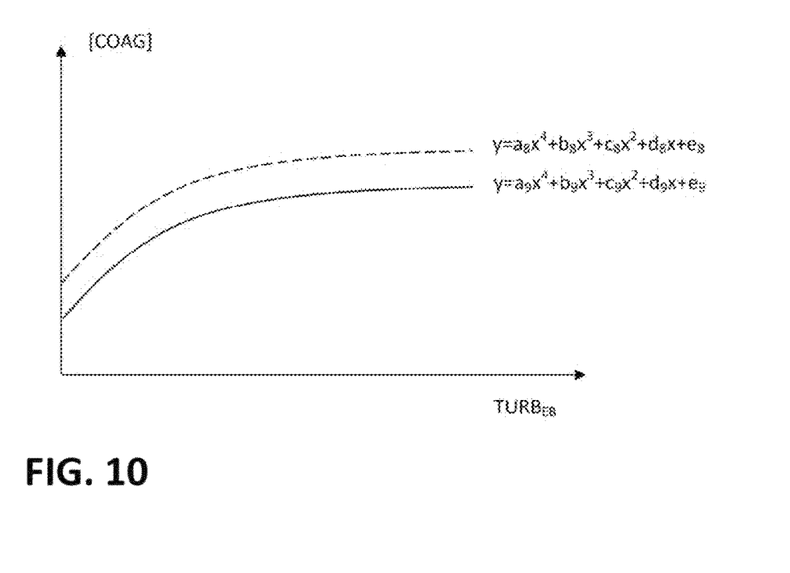
FIG. 10 illustrates fourth relationships enabling determination of a second coagulant dose.

FIG. 10 illustrates fourth relationships enabling a second coagulant dose to be determined. The fourth relationships give the coagulant dose to be added in order to attain a turbidity value in the clarified water of at least less than 5 NTU and preferably less than 3 NTU.

The fourth relationships are dependent on the turbidity of the raw water ($TURB_{EB}$) and on the temperature of the raw water ($T_{EB}$).

Accordingly, FIG. 10 illustrates two fourth polynomial relationships, for example of the fourth degree, connecting the coagulant dose required in order to obtain a clarified water turbidity of at least less than 5 NTU and preferably less than 3 NTU, to the turbidity of the raw water ($TURB_{EB}$), the coefficients of which vary as a function of the temperature of the raw water ($T_{EB}$):
- an equation $y=a_8x^4+b_8x^3+c_8x^2+d_8x+e_8$, when the temperature of the raw water is less than a threshold θ (dashed curve);
- an equation $y=a_9x^4+b_9x3+c_9x^2+d_9x+e_9$, when the temperature of the raw water is greater than a threshold θ (continuous curve).

The second coagulant dose is obtained by measuring the turbidity of the raw water by means of an in-line turbidity sensor or of manual measurements, and by measuring the temperature by means of a temperature sensor or of manual measurements, and by using the functions defined above in order to define the coagulant dose required in order to remove the turbidity.

Figure 11:
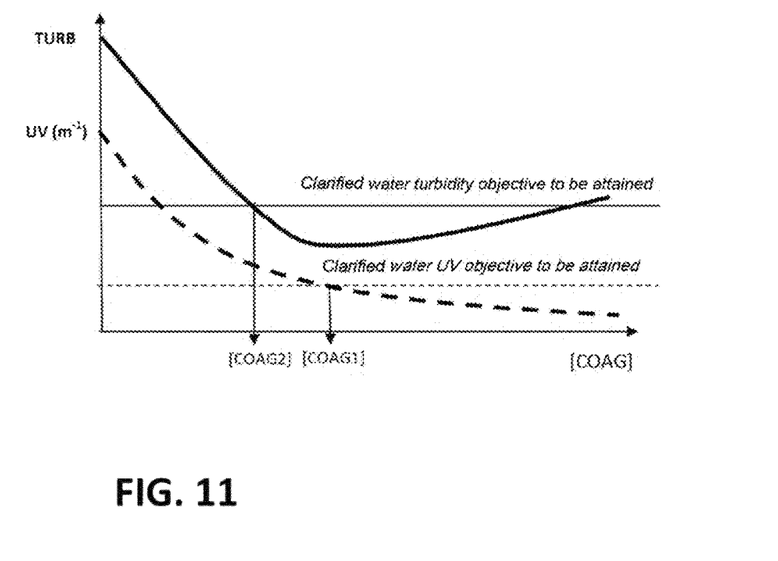
FIG. 11 illustrates the second embodiment.

FIG. 11 illustrates the second embodiment, for the case where the first coagulant dose [COAG1] calculated for attaining the objective of organic matter in the clarified water (expressed in terms of UV) is greater than the second coagulant dose [COAG2] calculated for lowering the turbidity objective of the clarified water. The optimal dose in this case is the first coagulant dose which enables a reduction both in the organic matter and in the turbidity in accordance with the objectives set.

The method of the invention therefore enables calculation of the appropriate dose of coagulant, and even of one or more other reagents, to be applied in order to meet the objective of quality at the plant outlet and/or at the end of coagulation/settlement.

It enables a more accurate and more correct quantity of coagulant to be obtained, for use in a raw water, which is not specific to one site, but which is established as a function of the characteristics of the water to be treated.

It enables account to be taken of the steps downstream of the coagulation, by defining, for example, a quality objective at the plant outlet. This allows the most correct dosing.

It further enables definition of the best balance between coagulant dose to be added and/or powdered activated carbon dose to be added and/or acid dose to be added, in order to reduce the coagulation pH, with the objective of quality at the plant outlet and/or at the end of coagulation/settlement.

It enables, moreover, the operator to be notified of any changes and/or problems arising in the raw water or in the plant. This enables said operator, in particular, to know whether it is necessary to modify the dosage of the coagulant (or of a second reagent).

Lastly, the entirety of the results of the calculations, and also the in-line monitoring of the quality of the water, may be rendered on a dashboard which can be adapted to any type of medium (computer, tablet, smartphone, Cloud).

A supervision system may make it possible, moreover, to carry out remote activation of means (for example, at least one metering pump) for adjusting the dose of coagulant (or of a second reagent).

The invention claimed is:

1. A method for determining an optimal coagulant dose ($[COAG]_{OPT}$) of a coagulant for raw water (EB), comprising:
   determining, for the raw water (EB), a first organic parameter value ($P_{ORG1\_EB}$) of a first organic parameter ($P_{OR1}$), a second mineral parameter value ($P_{MIN2\_EB}$) of a second mineral parameter ($P_{MIN2}$), a class of water ($CL_{EB}$), and a third organic parameter value ($P_{ORG3\_EB}$) of a third organic parameter ($P_{ORG3}$),
   defining a target value ($P_{ORG3\_ED}$), for a clarified water, of the third organic parameter ($P_{ORG3}$);
   selecting a function (fi) for establishing a relationship between the third organic parameter ($P_{ORG3}$) and a dose of coagulant ([COAG]) added to the raw water, said function being selected for the class of water ($CL_{EB}$) determined for the raw water and for the third organic parameter value ($P_{ORG3\_EB}$), determined for the raw water, of the third organic parameter ($P_{ORG3}$); and
   using the function (fi) selected, so as to determine a first dose of coagulant ([COAG1]) corresponding to the target value ($P_{ORG3\_ED}$), defined for the clarified water, of the third organic parameter ($P_{ORG3}$),
   wherein the first organic parameter ($P_{ORG1}$) relates to dissolved organic matter value for the raw water and provides information on an ability of the raw water to coagulate; wherein the second mineral parameter ($P_{MIN2}$) relates to the mineral load of the raw water; wherein the class of water ($CL_{EB}$) for the raw water is determined as a function of the values ($P_{ORG1\_EB}$ and $P_{MIN2\_EB}$) of the first organic parameter ($P_{ORG1}$) and of the second mineral parameter ($P_{MIN2}$), the class of water being characterized by a first range of values of the first organic parameter ($P_{ORG1}$) and a second range of values of the second mineral parameter ($P_{MIN2}$); and wherein the value ($P_{ORG3\_EB}$) for the raw water of a third organic parameter ($P_{ORG3}$), provides information on a quantity of dissolved organic matter in the raw water.

2. The method as claimed in claim 1, comprising a preliminary step of determining a plurality of classes of water ($CL_i$), each class of water being characterized by at least one first range of values of at least one first organic parameter ($P_{ORG1}$) for providing information on the ability of the water to coagulate, and the second range of values of at least one second mineral parameter ($P_{MIN2}$) for providing information on the mineral load of the raw water.

3. The method as claimed in claim 1, the first organic parameter ($P_{ORG1}$) being selected from UV absorbance, preferably at 254 nm, a dissolved organic carbon (DOC), a ratio (SUVA) between the UV absorbance, preferably at 254 nm, and the dissolved organic carbon (DOC), or a combination of said parameters.

4. The method as claimed in claim 1, the second mineral parameter ($P_{MIN2}$) being selected from complete alkalimetric titer (TAC), concentration of chloride ions, concentration of sodium ions, concentration of sulfate ions, concentration of calcium ions, concentration of magnesium ions, concentration of silicate ions, conductivity, or a combination of said parameters.

5. The method as claimed in claim 1, the third organic parameter ($P_{ORG3}$) being selected from UV absorbance, preferably at 254 nm, or dissolved organic carbon (DOC).

6. The method as claimed in claim 1, further comprising determining a coagulation pH (pHc), the function ($f_i$) being further selected for the coagulation pH (pHc).

7. The method as claimed in claim 2, the selected function ($f_i$) being an exponential function for an entirety of the plurality of classes of water ($CL_i$), such that:

$$P_{ORG3} = f_i([COAG]) = A_i e^{-B_i[COAG]} + C_i;$$

the coefficients $A_i$, $B_i$ and $C_i$ are coefficients being determinable by relationships ($R_{i1}$, $R_{i2}$, $R_{i3}$) which are given according to the class of water ($CL_i$), for a given value ($P_{ORG3\_EB}$), for the raw water, of the third organic parameter ($P_{ORG3}$), and for a given coagulation pH (pHc).

8. The method as claimed in claim 7, the coefficient $C_i$ being defined as being a value of noncoagulable organic matter, for the given value ($P_{ORG3\_EB}$), for the raw water, of the third organic parameter and for the given coagulation pH (pHc).

9. The method as claimed in claim 8, the coefficient $C_i$ being connected to the given value ($P_{ORG3\_EB}$), for the raw water, of the third organic parameter by first, linear relationships $R_{i1}$.

10. The method as claimed in claim 8, the coefficient $C_i$ being connected to the coagulation pH (pHc) by a second, linear, polynomial or exponential, relationship $R_{i2}$.

11. The method as claimed in claim 7, the coefficient $A_i$ being equal to the given value ($P_{ORG3\_EB}$), determined for the raw water, of the third organic parameter, minus the coefficient $C_i$.

12. The method as claimed in claim 11, the coefficient $B_i$ being calculated on a basis of a second derivative value $\alpha_i$ of the selected function ($f_i$), of the coefficient $A_i$ and of the given value ($P_{ORG3\_EB}$), determined for the raw water, of the third organic parameter ($P_{ORG3}$).

13. The method as claimed in claim 12, the second derivative value $d_i$ of the selected function ($f_i$) being attained for the coagulant dose ([COAG]) equal to a maximum economically allowable dose (DMEA), said maximum economically allowable dose being the coagulant dose on a basis of which a cost of treatment with the coagulant becomes greater than a cost of a treatment by an alternative reagent, and being determinable by third, linear relationships $R_{i3}$ as a function of the given value ($P_{ORG3\_EB}$), determined for the raw water, of the third organic parameter.

14. The method as claimed in claim 1, the values, for the raw water, of the first organic parameter ($P_{ORG1}$), of the second mineral parameter ($P_{MIN2}$) and of the third organic parameter ($P_{ORG3}$) being determined by measurements of the raw water, for example in-line measurements performed by a dissolved organic carbon sensor, a UV sensor, a conductivity sensor, or sampling measurements performed by a complete alkalimetric titer (TAC) analyzer, an ion concentration analyzer, or a combination of such measurements.

15. The method as claimed in claim 1, further comprising determining a dose of a second reagent (REAC), for example a powdered activated carbon or an acid, and determining the first coagulant dose ([COAG1]) to be added to attain the target value ($P_{ORG3\_ED}$), defined for the clarified water, of the third organic parameter ($P_{ORG3}$) with the second reagent.

16. The method as claimed in claim 1, further comprising:
   defining a target turbidity value ($TURB_{ED}$) for the clarified water;
   determining a second coagulant dose ([COAG2]) to be added to the raw water (EB) for attaining the target turbidity value ($TURB_{ED}$) for the clarified water; and
   determining the optimal coagulant dose ([$COAG]_{OPT}$) to be added to the raw water, comprising a comparison of the first coagulant dose ([COAG1]) and the second coagulant dose ([COAG2]), said optimal coagulant dose being the greater dose between the first coagulant dose ([COAG1]) and the second coagulant dose ([COAG2]).

17. A method implemented on a computer medium for effecting the steps of the method as claimed in claim 1.

18. A raw water treatment process comprising at least a step of coagulating the raw water, the coagulant dose added being the optimal coagulant dose ([$COAG_{OPT}$]), determined by the determination method as in claim 1.

* * * * *

UNITED STATES PATENT AND TRADEMARK OFFICE
CERTIFICATE OF CORRECTION

PATENT NO. : 12,071,358 B2
APPLICATION NO. : 17/259189
DATED : August 27, 2024
INVENTOR(S) : Sepideh Hassanzadeh et al.

It is certified that error appears in the above-identified patent and that said Letters Patent is hereby corrected as shown below:

In the Claims

In Claim 1, Column 18, Line 27, "of a first organic parameter ($P_{OR1}$)" should be -- of a first organic parameter ($P_{ORG1}$), --.

In Claim 13, Column 20, Line 4, "derivative value di of the selected function" should be -- derivative value $\alpha i$ of the selected function --.

Signed and Sealed this
Fifteenth Day of October, 2024

Katherine Kelly Vidal
*Director of the United States Patent and Trademark Office*